(12) United States Patent
Dominowska et al.

(10) Patent No.: US 8,001,215 B2
(45) Date of Patent: Aug. 16, 2011

(54) UNLIMITED HISTORY STORE FOR NAVIGATIONAL WEB APPLICATIONS

(75) Inventors: Ewa Dominowska, Kirkland, WA (US); Robert J. Ragno, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 884 days.

(21) Appl. No.: 11/289,154

(22) Filed: Nov. 29, 2005

(65) Prior Publication Data

US 2007/0124693 A1    May 31, 2007

(51) Int. Cl.
G06F 15/16    (2006.01)
G06F 15/173    (2006.01)
(52) U.S. Cl. .................................. 709/218; 709/224
(58) Field of Classification Search .............. 709/219
See application file for complete search history.

(56) References Cited

U.S. PATENT DOCUMENTS

| | | | | |
|---|---|---|---|---|
| 5,813,007 | A * | 9/1998 | Nielsen | 707/10 |
| 6,823,490 | B1 * | 11/2004 | Dauerer et al. | 715/234 |
| 2002/0120648 | A1 * | 8/2002 | Ball et al. | 707/511 |
| 2004/0044767 | A1 * | 3/2004 | Rivers et al. | 709/225 |

OTHER PUBLICATIONS

Jill T. Freeze, "SAMS Teach Yourself Microsoft Internet Explorer 5", 1999, Sams Publishing, pp. 29, 30 & 59.*
WayBackMachine. http://www.archive.org/web/web/php, last viewed Nov. 1, 2005.

* cited by examiner

*Primary Examiner* — Ian N Moore
*Assistant Examiner* — Afshawn Towfighi
(74) *Attorney, Agent, or Firm* — Lee & Hayes, PLLC (57) ABSTRACT

A unique system and method that facilitates storing virtually all web content that has been viewed or visited by a user on the user's local cache for access anytime by the user. The system and method involve monitoring the user's web activity. Pages that have been viewed or visited can be saved at timed intervals to a local cache. If pages have been updated, those changes can be saved. Thus, multiple versions of a web page can be accessed and the user can select which version to view. The updated page can be visually modified to distinguish between older and newer content. If offline, the user can still view desired pages by accessing them from the local cache. By saving the user's web activity, the user can resume a previous browsing session. A user can also choose to receive periodic notifications when changes to previously viewed pages occur.

20 Claims, 10 Drawing Sheets

UNLIMITED HISTORY STORE FOR NAVIGATIONAL WEB APPLICATIONS

BACKGROUND

Over the last decade, the number of Internet users has increased exponentially. Students and various types of professionals constantly browse and search for information on the Internet and often rely heavily on it as a primary reference tool. In addition, the Internet has become a unique resource for home shopping, commercial transactions, and entertainment. Users can spend hours and hours on the Internet, and with most Internet browser applications, temporary files can be maintained for each page the user visits. As a result, hundreds if not thousands of temporary files can be generated and stored on the user's network or machine. Management of this great amount of data, including retrieval of any of the stored temporary files, can be challenging, cumbersome, and problematic regardless of where they are stored.

Conventional archival systems currently exist for the main purpose of maintaining a historical record of Internet use. These systems allow caching of the user's web pages based on dates (archive dates). Archive dates are selected times when the page was saved. Unfortunately, archive dates are limited for any particular page since the page may only be saved to the server a maximum number of times (e.g., 4 archival dates per site) or for a limited amount of time. To access a saved page, the conventional systems require the user to search by page and then by archive date. This can be a rather exhausting and overwhelming endeavor for most Internet users. Hence, such archival systems tend to be rather unhelpful to the majority of Internet users. Consequently, users essentially lack the ability to take advantage of all their stored information.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to a system(s) and/or methodology that facilitate storing or archiving web-based information to a local cache or storage area to enhance a user's experience when browsing the web. More specifically, the system and method take advantage of the ample storage space available on the user's machine by saving every, or substantially all, web pages or any other web-based content visited or viewed by the user to the user's machine and then allowing the user to access, browse through, search and retrieve useful information therefrom at anytime. In addition to storing each web page the user visits or views, substantive changes to any page can be stored and made available to the user through the use of version tracking. That is, new versions of a web page captured at various times can be marked or noted as such so that when the user wishes to view the page, he/she can be aware of which versions are available for viewing and/or how many versions of the page currently exist or are currently available to the user.

Version tracking can involve visual modification of a web page, whereby notation or color indicates changes (e.g., additions or deletions) to the content. For example, the user can distinguish between text which was present on Jun. 14, 2005 (initial visit to the page) and new text added on Jun. 26, 2005 (second visit to the page). Thus, the user can tell when a page has been updated and in what manner (e.g., inserted and/or deleted content).

Because the user's browser and/or system can record which pages the user has viewed or accessed, automatic updates to the content on any such page can be accomplished. In particular, the system or browser can check the Internet for changes to any or all pages that the user has previously accessed. Alternatively, the user can selectively indicate which sites to monitor for changes and can set the extent or type of changes that warrant an automatic storage of new document versions. The user can also be notified of such updates or changes to any selected or all sites.

Often times, a user may find himself/herself offline or may be experiencing a slower connection with respect to the Internet, for example. In such cases, the subject application allows for immediate availability of any pages the user has ever visited or accessed. (A user can choose to also store pages linked to the currently viewed page.) Hence, the user is provided with uninterrupted access to information that may be deemed relatively important and would otherwise be lost or unavailable if it were not for the ability to store every page accessed or viewed by the user to the user' machine (e.g., local storage). Not only is the information available to the user when offline or disconnected from the Internet, the information is also searchable. Unlike conventional temporary file storage systems, the subject system and method provide the user with an ability to search or browse the temporary file store. Therefore, the user can easily find any stored pages that relate to one another or that involve a particular subject matter without having to rely on his/her memory with respect to when he/she last visited the page(s). In the event of a slow connection, the user can access the most recent cached version of a desired page. When the current page becomes available, the view of the page can be updated.

In addition to uninterrupted access to Web information, the system and method can also create an archive of web information that is no longer available on the Internet. This can be done for each particular user. For instance, many users return to a website looking for a piece of information that was previously found there. However, since the Web is not static and information can change frequently or be removed at any time, the desired piece of information may no longer "exist" on the Web. Through the creation of a private, browsable archive, the user can continue to have access to this information even though it is no longer available on the Internet.

For ease of discussion and brevity reasons, the subject application will be discussed with respect to web pages, though it should be appreciated that the application can be applied to or carried out with respect to any web-related content or any information accessed, retrieved, or viewed on the Web. To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject systems and/or methods can incorporate various inference schemes and/or techniques in connection with recognizing and identifying a user's current state (e.g., page or content currently being viewed) as it relates to automatically resuming the user's former state or previous browsing session. For instance, the user's current state may be "offline". Based on at least this piece of data, the user's system can access content stored in the local cache in order to resume the user's previous Internet session. Furthermore, the system can also infer that the user's last position on any page based on the user's viewport position and save this information along with the page itself and any other data relating thereto. If the user desires to resume this browsing session, the system can put him back where he left off.

In addition, such inference schemes can be employed to automatically illustrate any changes or updates to the content on any page previously viewed by the user. Furthermore, inference schemes can be used to provide a smooth and transparent transition between an online and an offline state. For example, as a user is surfing the Internet and viewing a page, he may inadvertently experience a slow connection or may be disconnected for a time. In order to avoid interrupting the user's reading, the system can revert or switch to the saved copy of the page in a transparent manner. Thus, the user may not even be aware that he briefly lost his connection (the user can still use existing cues such as browser's online status to stay informed on their actual status). In fact, the user can continue to browse Internet material as long as it was previously saved locally to the user's machine. Moreover, the inference schemes can employ the user's historical behavior or preferences to enhance the user's ability to have near constant access to web-based material.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Most conventional browsers or storage systems offer temporary storage of the last accessed copy of a text-based page in the user's cache. Arguably, the user has access to this page offline, but unfortunately, the browser saves every page that the user accesses in a similar manner and retains them for limited lengths of time. As a result, the user's cache consumes and retains hundreds or thousands of pages, most of which are essentially inaccessible to the user. This is because conventional systems and browsers do not offer a browsable cache. As will be described in detail, the systems and methods herein provide for a browsable and searchable local cache that offers the user practical access to any stored web related content any time.

Typical users require a visual cue to recall the content they were viewing, their last position on the page, a link they pursued, or their browsing path, rather than an obscure file name and a date which is usually given by conventional browser or storage systems. To facilitate fast recall, the subject application provides a universal set of information for the user that is navigable. Furthermore, various techniques for summarizing or condensing updated or changed information for the user in a clear and conspicuous format are provided in order to maintain a manageable amount of information in the local cache. Hence, users can browse through and among massive amounts of text-based pages and images with relative ease when online or offline in a seamless and transparent manner.

Figure 1:
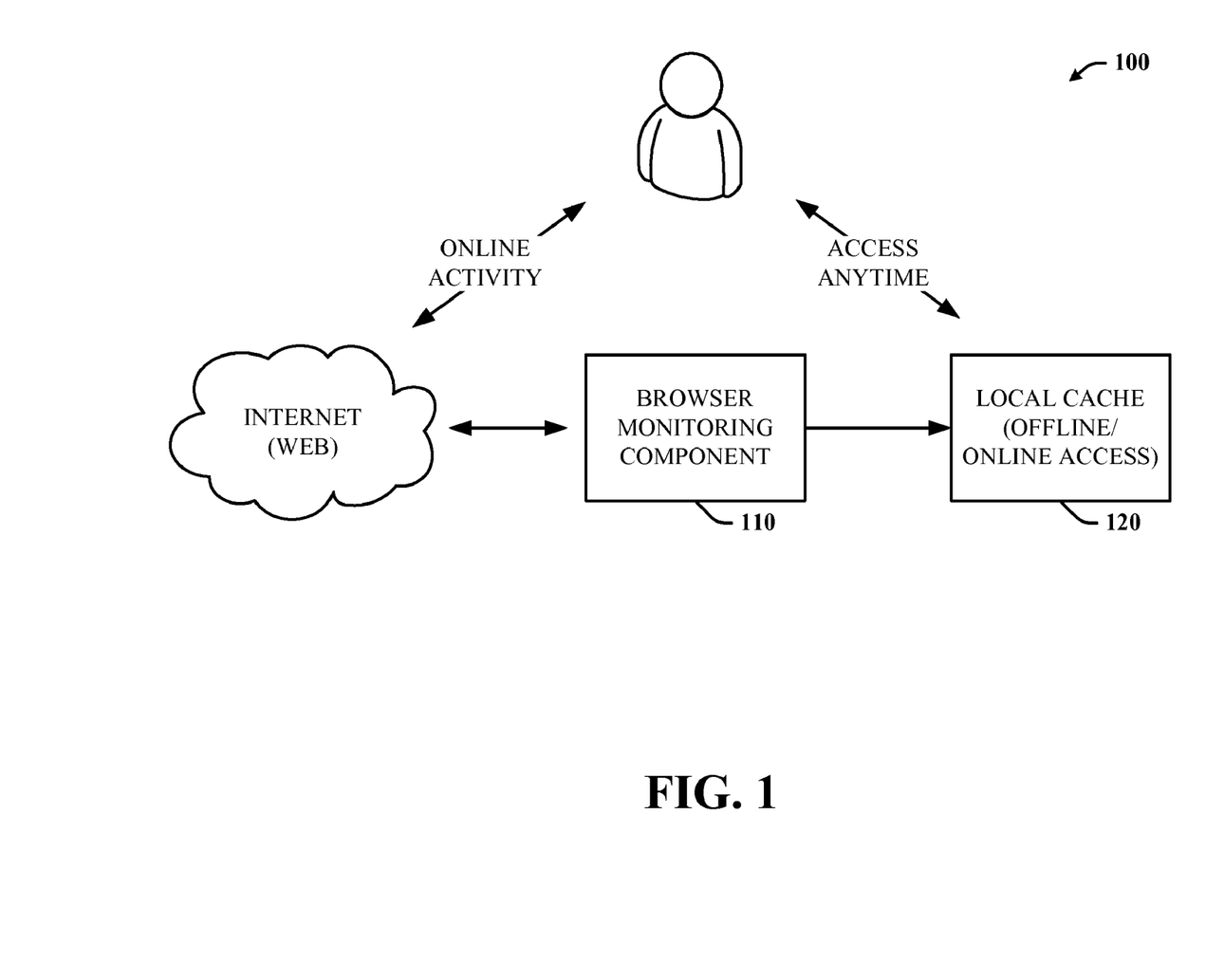
FIG. 1 is a block diagram of a system that facilitates local storage and retrieval of web-based content to allow for an FIG. 2 is a block diagram of a system that facilitates local storage of web-based content per user and that permits the user to search or browse through the local storage to revisit previously accessed web sites.

Referring now to FIG. 1, there is a general block diagram of a system 100 that facilitates local storage of web-based content to allow for an enhanced user experience when browsing or obtaining web-based information regardless of the user's connection state. The system 100 includes a browser monitoring component 110 that can monitor a user's online activity and capture the user's state. When online, the monitoring component 110 can recognize and identify current content that the user is viewing as well as previous pages that the user has viewed prior thereto. In addition, the monitoring component 110 can "mark" the user's last position on the page in terms of the viewport position and/or the user's last scroll position. All of this data can be communicated to a local cache 120 each time a user views the page. Additionally, a scheduling system (not included) could be used to simulate page viewing on a timed basis as determined by the user or by the system default settings.

According to at least one recent study, storage capacity on a local machine far exceeds cache requirements for storing all of this data. Assuming that the user's machine has unlimited storage capacity, the data can be stored indefinitely for the user's convenience. This means that web content that was accessed by the user at one time but that may no longer be available on the web can still be viewed by the user from the local cache 120 at anytime. Consequently, the local cache 120 can also serve as an archival reference tool. Moreover, a universal set of web related information is created for the user by storing nearly every page ever accessed by such user.

Because the local cache 120 can be set to save the user's information (e.g., page in view, position on page, content of page, time, etc.) every k seconds, minutes, hours, etc. (where k is an integer greater than 1), multiple versions of any page can undoubtedly result. Maintaining such large amounts of data is feasible; however, to improve the manageability of the local cache 120, it (120) can be optimized to facilitate more efficient browsing, searching, and data retrieval. This can be accomplished in part by an analysis component (not shown), for instance, that compares the most recently stored page with the previously stored page so that only changes to the page are saved—rather than each whole page. Thus, content that has not changed is not saved again to mitigate duplicated data.

Any content on the more recent page that has been updated or changed from the previous version can be presented to the user in one of at least two ways. In one approach, the page itself can be visually modified to illustrate which content has changed. For example, a modification component (not shown) can highlight or change the font color of new content to set it apart from preexisting content. Thus, a new image may be framed with a color-coded box. When color is used as the indicator, different colors can represent different versions of the page. That is, in terms of new or changed content, each specific color can be employed to denote a particular version of the page or a "date" signifying when the change occurred. For instance, pink highlight can mean the "Jun. 14, 2005 version"; yellow highlight can mean the "Jul. 4, 2005 version" and orange highlight can mean the "Nov. 10, 2005" version. Content that has been deleted from the previous version can be lined out or may be removed and not visible to the user.

In another approach, the changes to the page can be hidden from plain view but an icon or other symbol can appear on the page. The user can either click on or hover over the icon or symbol, and when doing so, the changes can appear. Alternatively, a pop-up menu or window can appear with a list of the available versions for the page. The user can select one or more versions to view and the display can change accordingly. In yet another variation, an inset window can pop-up and summarize the changes between the previous version and the most recent version of the page. It should be appreciated that other visual modifications are also possible to assist the user in distinguishing between "new or newer" and old content and that any combination of the above approaches is contemplated as well to fall within the scope of the system 100.

Moreover, whole pages need not be saved in the local cache 120. Rather, only the differences among each saved version can be stored in the local cache 120 to facilitate a more manageable cache size. Furthermore, the local cache 120 can be accessed by the user regardless of the user's connection status (e.g., online or offline).

Figure 2:
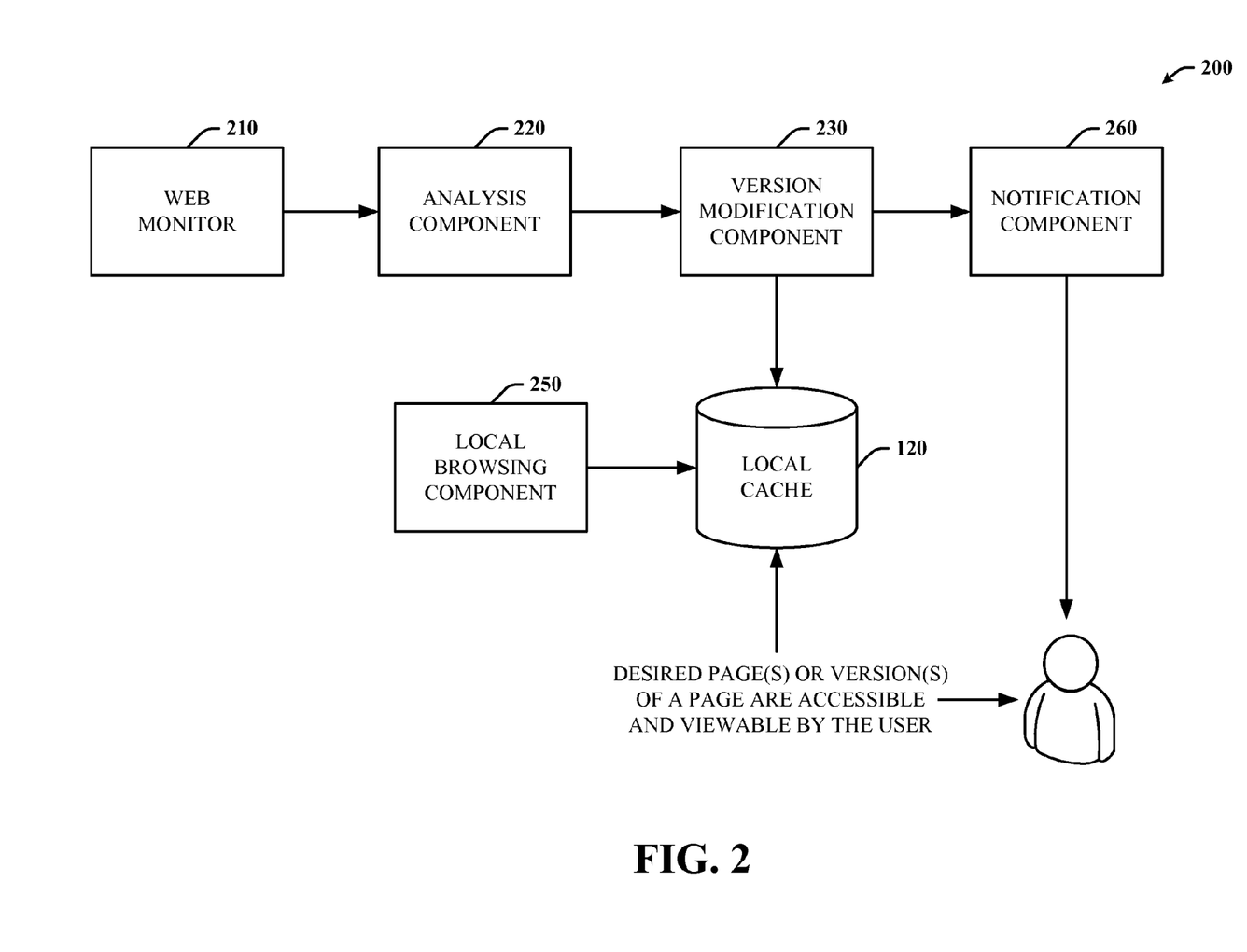

Referring now to FIG. 2, there is a block diagram of a system 200 that facilitates local storage of web-based content and provides the user with the ability to search or browse through the local storage to revisit any previously accessed content (e.g., web sites). The system 200 includes a web monitor 210 that can crawl and monitor the user's preferred or desired web pages based on the user's "favorite" sites or in accordance with the pages that have been previously stored. The web monitor 210 can signal an analysis component 220 when at least one page change is detected. The analysis component 220 can determine whether the changes detected on the page satisfy a threshold. For instance, changes to banner ads on the page may not satisfy the threshold; however text and/or images included in the body section of the page may satisfy the threshold.

In the case of a new, not previously viewed page, no other page can be compared to the new page; thus, the new page apparently satisfies the threshold. However, if the page was previously viewed by the user and a copy of such was stored, the analysis component 220 can determine if the changes satisfy a threshold. That is, if the changes to the (desired) content are sufficient to warrant storing a new version of the page, then the differences between the pages can be noted. In particular, new pages or pages including changed content can be sent to a version modification component 230, whereupon the differences can be determined and presented in a new or modified version of the page. For example, in the case of a changed page, the changed content on that page can be made distinguishable using one or more visual indicators, such as text (e.g., animated or enlarged), color, font, icon, or symbol. However, it should be understood that such visual indicators may only be visible to those users who are using the system 200 in conjunction with their Internet browser. The actual page on the Internet is not altered for the general public, but rather, a copy of the page is made and then modified according to the user's preferences.

Alternatively, any changes to the content can be summarized for the user and can appear in a pop-up or inset window depending on the user's preferences. Once the version is completed, it can be sent and saved to the local cache 120. From here, the user can browse through the stored content in the local cache 120 using a local browsing component 250. When the user goes offline or experiences a slowed connection, he/she can still access the page by browsing the local cache 120. The user can browse through any new versions of pages that have been stored. A graphic, symbol, or other visual sign can signal the user as to whether the new version has been viewed by the user from the local cache 120 or whether it has been viewed at all (either from the Internet or from the local cache 120).

When a new version of any page is detected in the local cache 120, the user can be notified of the new version via a notification component 250. The notification can come in many different formats and means to inform the user that a new or newer version of the page currently exists. To make it even easier for the user to view such versions, a link to the new or newer version can be provided to the user along with the notification.

Figure 3:
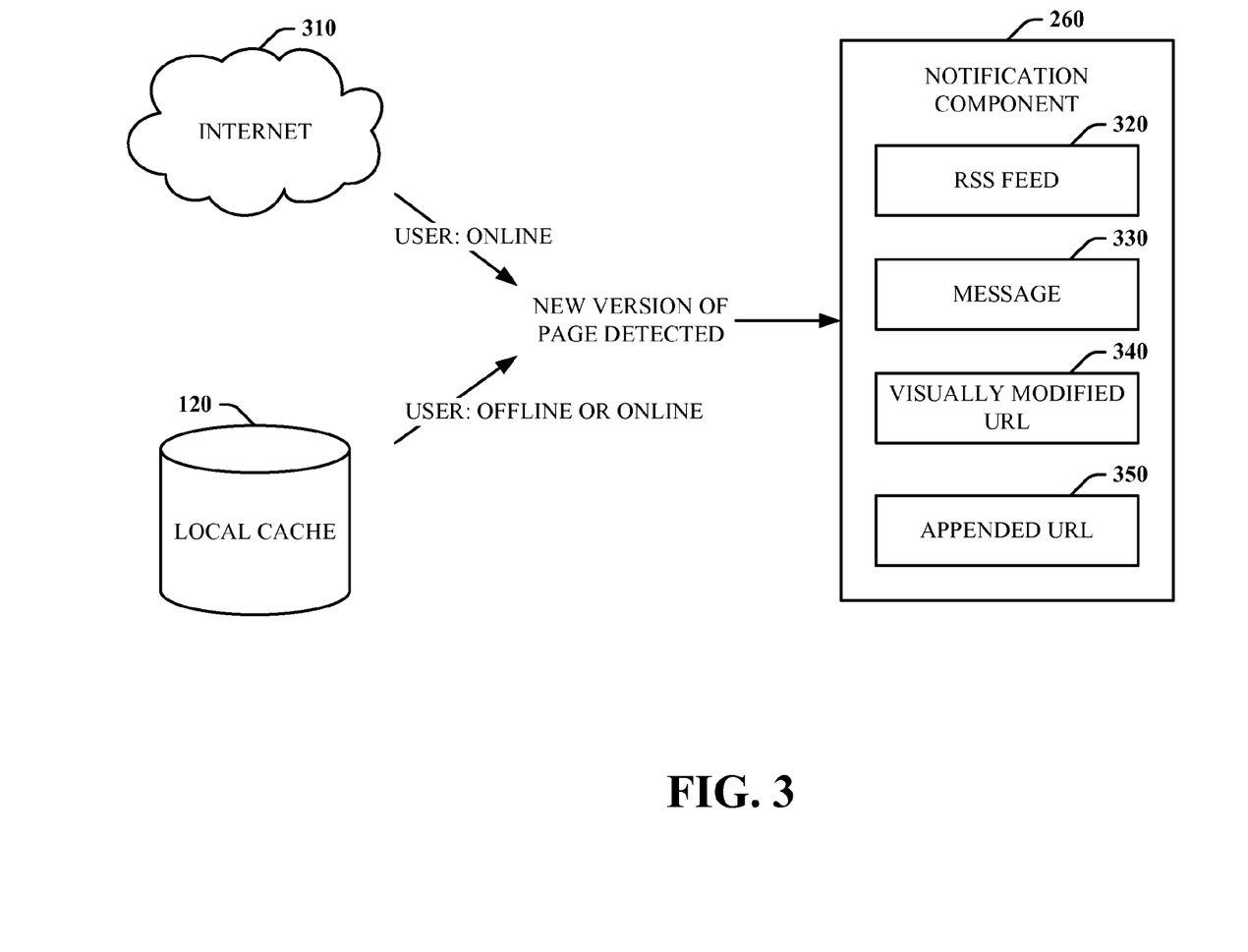
FIG. 3 is a block diagram of a system that facilitates storing web-based content to a user's local storage media and notifying the user of any new versions of content via one or more notification means.

Turning now to FIG. 3, there is a block diagram that demonstrates various notification means. As mentioned above, the user can explicitly or implicitly designate which pages to monitor for changes or updates. The web monitor 210 can passively detect when new or updated versions of pages or websites are available when the user is connected to the Internet 310. The new or updated pages can be locally stored on the user's machine in the local cache 120. If previous versions of the pages exist in the local cache 120, those versions can be updated to reflect the current content of the pages. Following, a cache monitoring component (not shown) can monitor the cache for changes (e.g., new versions of pages).

When a new version is detected, the user can be notified via the notification component 260 that such version is available in the cache 120. Thus, the user can be notified of changed content when online or offline. Notification can be made by an RSS feed 320 and/or via a message 330 such as an instant message or email. In the case where the user maintains a list of favorite or preferred sites, the "affected" URLs may be visually modified (340) such as by the presence of a graphic or symbol near or next to the URL or a change in appearance of the URL (e.g., color, font, font size). A new version indicator such as a hash (e.g., date, timestamp, version number, etc.) can also be appended to the URL (350) without conflicting with any other valid URL. Therefore, the user can see an overview of which sites (or pages) have been updated.

Figure 4:
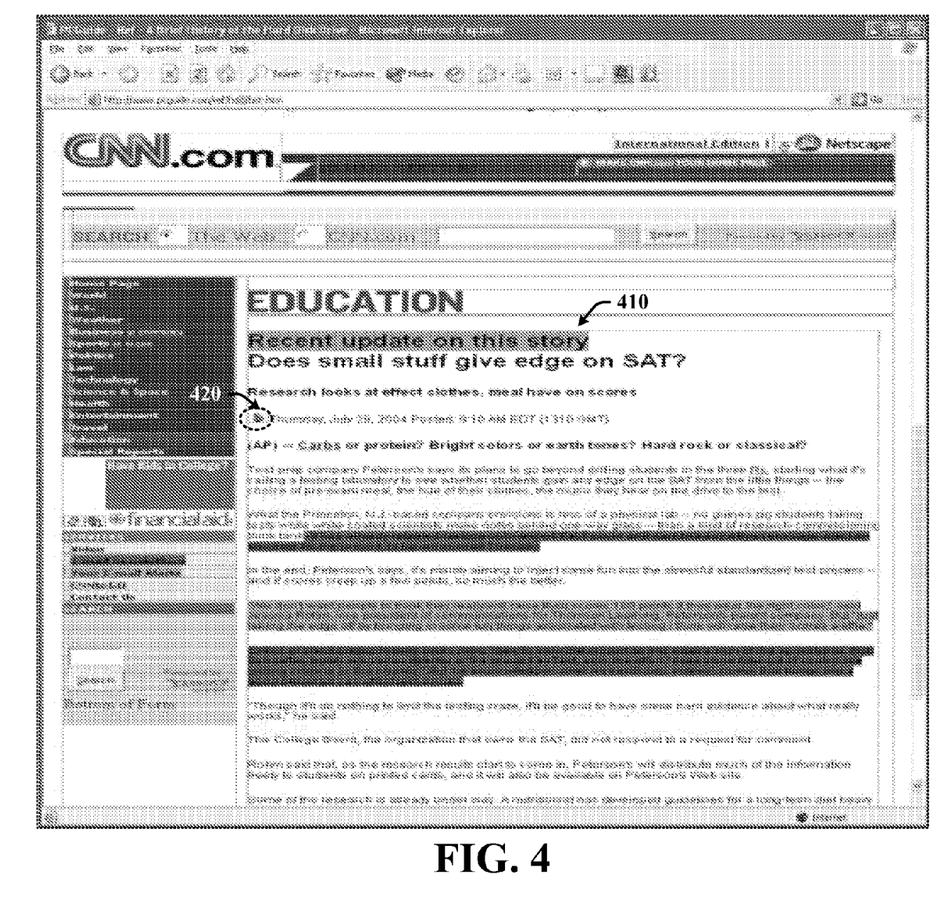
FIG. 4 is a screen shot of an exemplary user interface that demonstrates version tracking of web content to assist a user with distinguishing between various versions of or the changes in content on a web page.

Turning now to FIG. 4, there is a screen shot of an exemplary user interface 400 that demonstrates version tracking of web content to assist a user with distinguishing between various versions of or the changes in content over time on a web page. When viewing the interface 400 in color, various portions of the text are highlighted (410) in different colors, such that each color can denote new, deleted, or updated content. Deleted content may also be lined through as shown or just removed from the page. An icon or symbol 420 may also be noted in a conspicuous manner on the page to also indicate to the user that some content has changed on the page.

Figure 5:
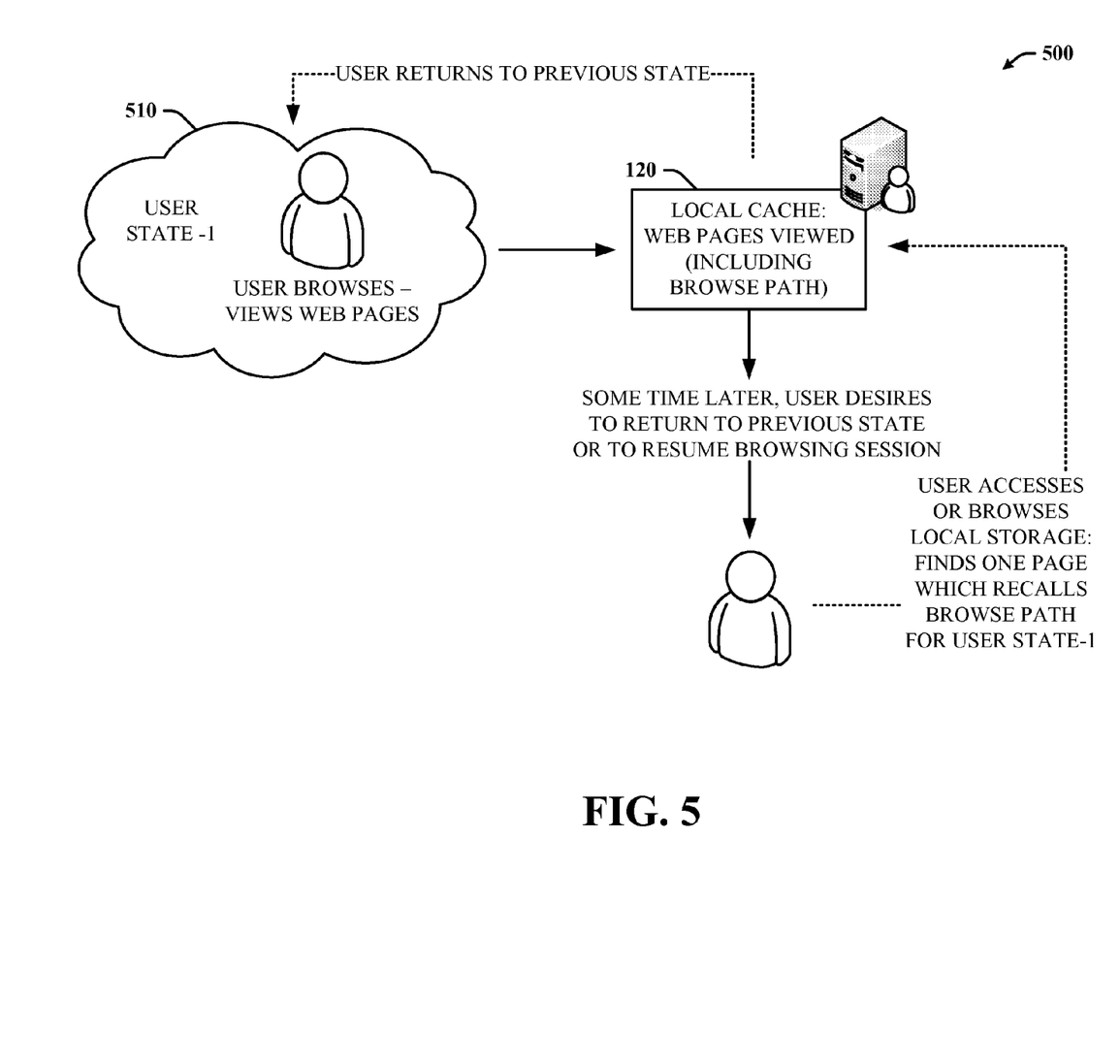
FIG. 5 is a block diagram of a system that facilitates allowing a user to resume or return to his/her previous browsing state based in part on web content previously stored during the user's browsing session.

Moving on to FIG. 5, there is a block diagram 500 that demonstrates the notion of allowing a user to resume or return to his/her previous browsing state based in part on data previously stored during the user's browsing session. For example, imagine that a user has been reading articles about pregnancy and baby products. From one site, she sees a good link to another site and so on and so on. Her current activity can be referred to as user state-1 510.

As she continues to jump from page to page or site to site, the content she views can be saved in her local cache 520. The data that can be saved includes but is not limited to the web pages she has viewed or visited, the viewport or scroll space position on each page, and her overall browsing path (e.g., browsing log). In other words, from the perspective of any one page Q that she visits, the page or pages she visited before or after can be saved as well in the order that they were viewed. Thus, she can backtrack to see pages she viewed before page Q by expressly opening page Q alone. If she viewed pages after page Q, she can proceed to those as well. Moreover, any pages deemed to be related to page Q such as those that were viewed before or after can automatically be opened without explicit user action.

Referring again to the above example, she wants to resume her previous browsing path a number of days later but is having difficulty in remembering the pages she viewed or where she left off. Based on her limited recollection, she remembers an article she read on a women's health site W and locates this stored page in her local cache 520. When this page is recalled or opened by the user, any sites or pages visited prior to or after this page can be provided as well. Essentially, the user's browsing path can be resumed as if the user never left her computer. From this site W, the user can click on "back" to go to previous pages or "forward" to go to subsequent pages. When the user can no longer go forward, she has reached the last page she was viewing during her previous browsing session and can continue on from this point.

Figure 6:
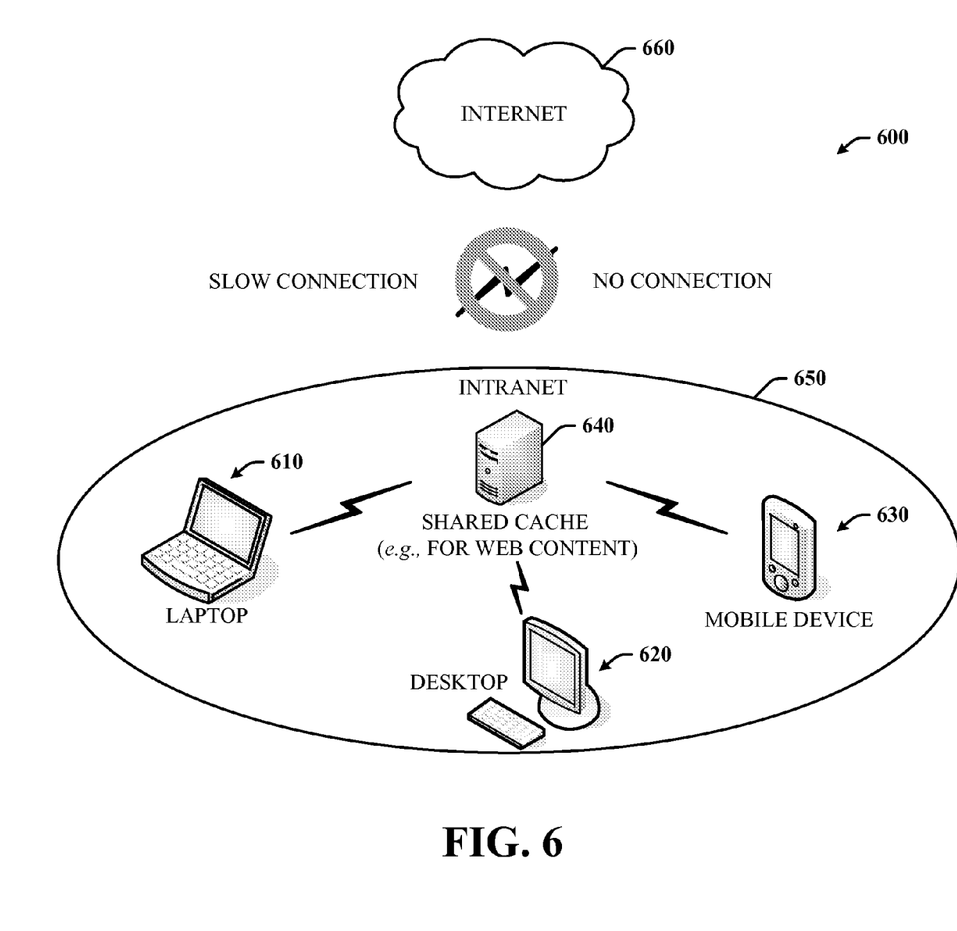
FIG. 6 is a block diagram that demonstrates storing web-based content per user or device to a shared local storage that devices located on an intranet can access when experiencing a slow connection or no connection to the Internet.

Turning now to FIG. 6, there is a block diagram 600 that demonstrates storing unlimited web-based content in a local storage that can be shared among a plurality of devices located on an intranet when experiencing a slow connection or no connection to the Internet. In some cases, multiple devices (e.g., laptop 610, desktop 620, and mobile device 630) can share a (remote and local) storage media or facility 640 (shared cache) by way of an intranet 650 and remain connected to the storage facility 640 despite being offline with respect to the Internet 660. The multiple devices can be operated by one or more users. Thus, to keep track of which user or device "views" which version of content, a device ID or user ID can be indicated with respect to each page or each version of a page. In addition, a notification log can be maintained as well to record which devices or users viewed which page or site and/or which version of the page or site.

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject application.

Figure 7:
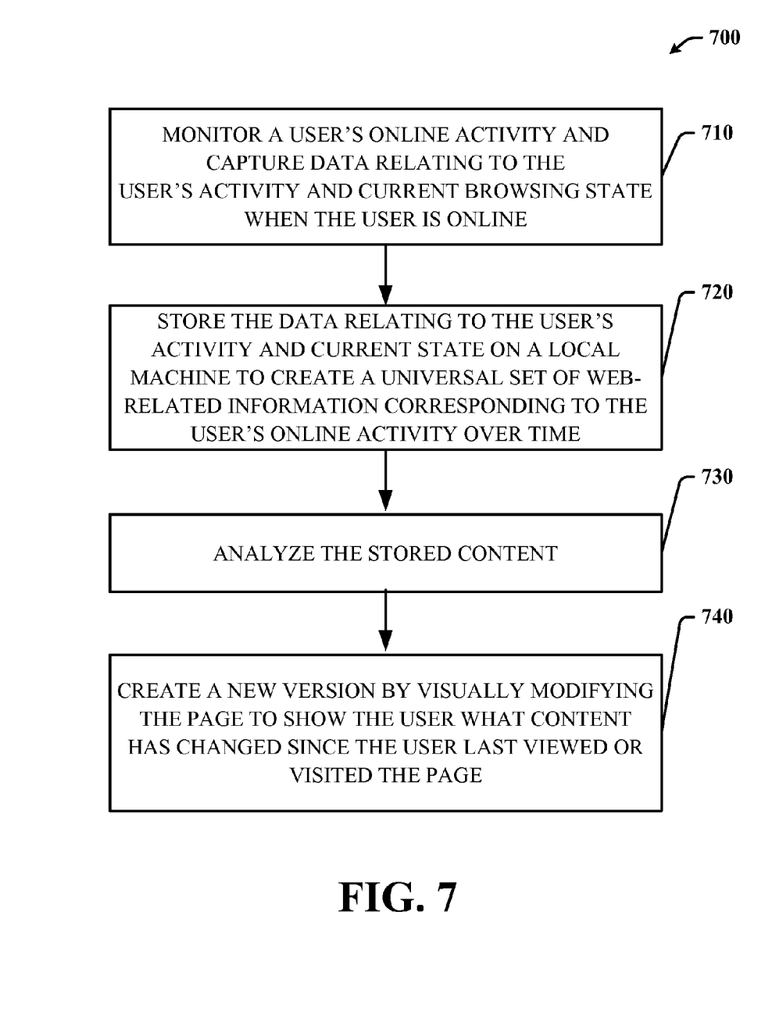
FIG. 7 is a flow chart illustrating an exemplary methodology that facilitates storing web-based content on a user's local storage media and modifying web pages to indicate updates or changes to the content on such pages.

Referring now to FIG. 7, there is a flow diagram illustrating an exemplary method 700 that facilitates storing unlimited web-based content on a user's local storage media and modifying web pages to bring the user's attention to updates or changes to the content on such pages. The method 700 involves monitoring a user's browsing activity at 710. At 720, web-based content that has been viewed or visited by the user and other data related thereto can be stored in the user's local storage media (e.g., local cache). The stored content can be analyzed at 730 such as per page. If a previous version of the page exists in the cache, then the newer and the older page can be compared for their differences.

At 740, a newer version can be created by visually modifying the page to show the user what content has changed since the user last viewed or visited the page. Visual modification can include adding color to distinguish between the age (date) of text or images. Highlighting, different fonts, and different font sizes can also be employed. When multiple versions of the page exist, the user can select which version to view. In addition, the user can select to see comparison views between at least two versions.

Figure 8:
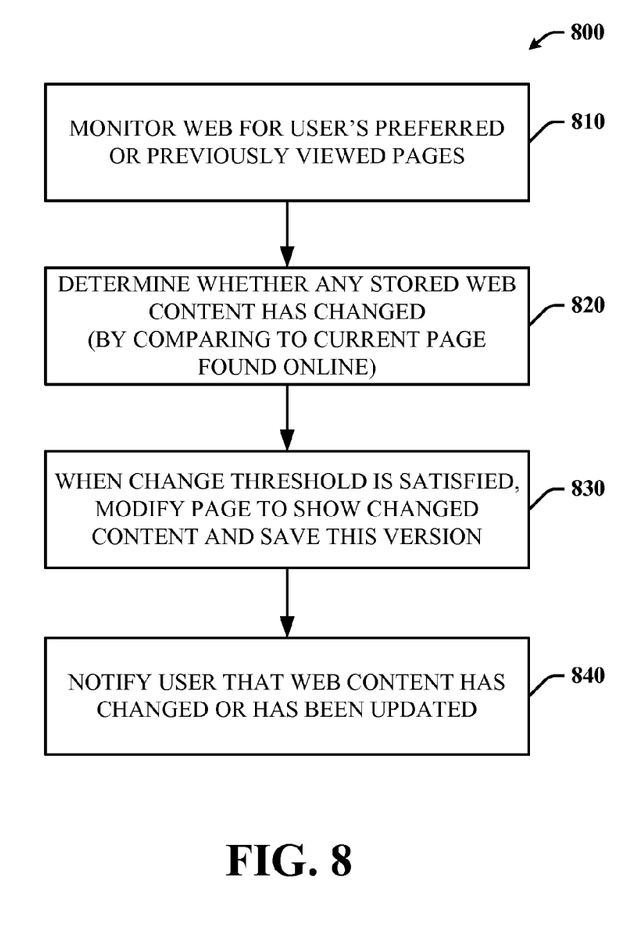
FIG. 8 is a flow chart illustrating an exemplary methodology that facilitates notifying a user of content that has changed by comparing locally stored web content to online web content.

In FIG. 8, there is a flow diagram of an exemplary method 800 that facilitates notifying a user when at least one desired or previously visited web page has been updated or changed. The method 800 involves monitoring the user's preferred or previously viewed pages on the web at 810. At 820, found pages can be compared to their previously stored counterparts. If there are sufficient changes to the current version found on the web compared to the previously stored version, then these changes can be stored on the user's local cache at 830. Whether the changes are sufficient can be determined in part by quantifying the types or number of changes and then comparing such changes to at least one threshold. If the changes satisfy the threshold, then they are sufficient to warrant saving them to the local cache. In the alternative, they can be saved to a shared local cache located on an intranet.

By saving the differences between at least two pages rather than the entirety of each page, the size of the local cache can be better maintained and managed and allow for more efficient data retrieval. However, if the user desires, whole pages can be stored. At 840, the user can be notified that a newer version of a desired page is available (e.g., at least one previously viewed page has been updated). Notification can be performed using any one of the following: an RSS feed; an email message; and/or an instant message. Additionally, the user can be informed that a change occurred by adding an icon or symbol to the page or URL and/or appending a hash to the URL to indicate the relative age or version to which the URL relates.

Figure 9:
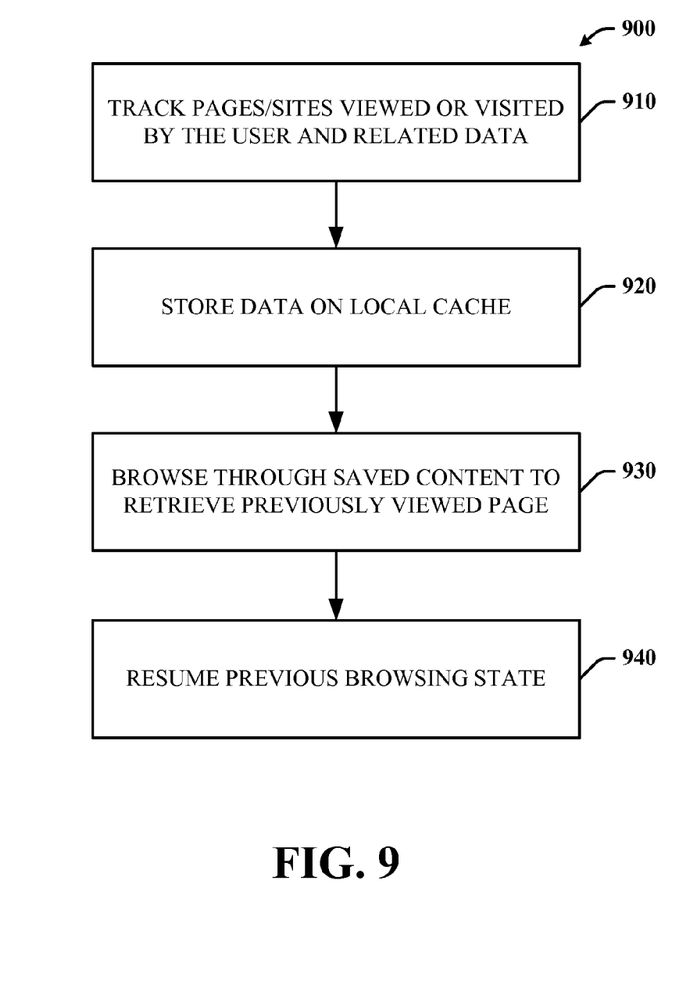
FIG. 9 is a flow chart illustrating an exemplary methodology that facilitates returning or resuming a user's browsing session or state.

FIG. 9 is a flow chart illustrating an exemplary method 900 that facilitates returning to or resuming a user's browsing session or state. The method 900 involves tracking web pages that the user visits and any related data at 910. This data can be stored in a local cache that is located on the user's machine, for example, at 920. At 930, the user can browse through the stored content to recall at least one page viewed previously. By accessing this page again, the user can resume his/her previous browsing session at 940.

The method 900 can record the pages that the user viewed before or after any page and even group related pages together. Relatedness of pages can be determined in part by the subject matter of the page and/or by following any clicked-on links (e.g., from page R, the user following link O, etc.). When a user explicitly opens a stored page from the local cache, any other page deemed to be related can open as well. In practice, imagine that the user cannot recall a certain page but knows it came after page Z. He/she can access page Z from the local cache and then may view pages that were visited subsequent to page Z to resume his/her browsing state.

Figure 10:
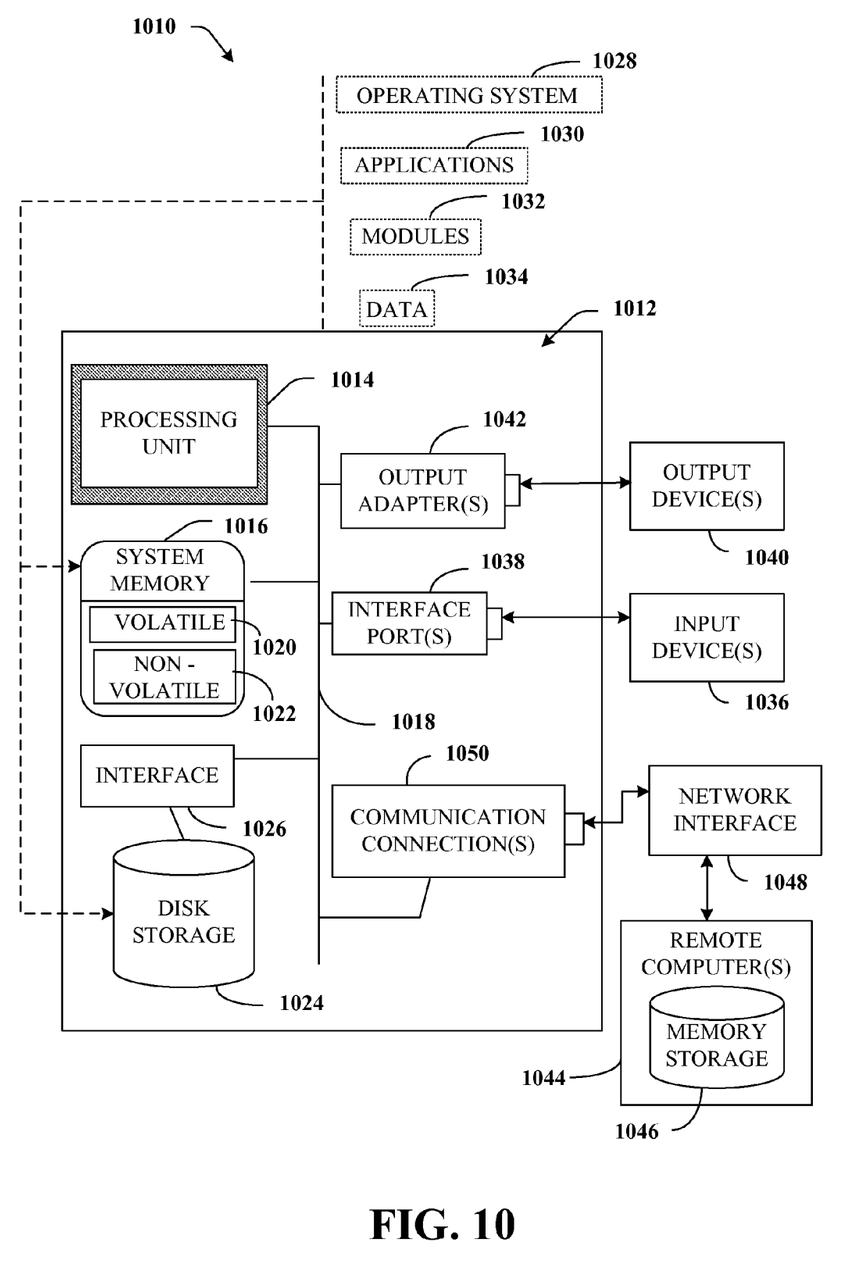
FIG. 10 illustrates an exemplary environment for implementing various aspects of the invention.

In order to provide additional context for various aspects of the subject application, FIG. 10 and the following discussion are intended to provide a brief, general description of a suitable operating environment 1010 in which various aspects of the subject application may be implemented. While the system(s) and/or method(s) is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1010 is only one example of a suitable operating environment and is not intended to suggest any limitation as to the scope of use or functionality of the system and/or method. Other well known computer systems, environments, and/or configurations that may be suitable for use with the system and/or method include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 10, an exemplary environment 1010 for implementing various aspects of the system and/or method includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/nonremovable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject system and/or method can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012 and to output information from computer 1012 to an output device 1040. Output adapter 1042 is provided to illustrate that there are some output devices 1040 like monitors, speakers, and printers among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates persistent, time-annotated local storage and retrieval of web-based content comprising:
    a browsing monitoring component that monitors a user's online activity and captures data relating to the user's activity and current browsing state when the user is online, wherein the data comprises at least the user's last position on a web page based on a corresponding viewport of the web page, and the current browsing state comprises at least a browsing path that includes a sequence of web pages visited by the user;
    a local cache that automatically stores the data relating to the user's activity and current state on a local machine to create a set of web-based information corresponding to the user's complete online activity over time that is browsable via a local browsing component and that is searchable via a search component to facilitate retrieval of stored data and related web-based information regardless of the local machine's connection state, wherein the local cache is configured to automatically resume a former state or a previous browsing session based on the data stored during the previous browsing session such that, when a stored web page is opened from the local cache to resume the former state or the previous browsing session, the viewport for the stored web page corresponds to the user's last position on the stored web page; and
    an analysis component that determines whether any changes that exist between versions of data captured by the browser monitoring component satisfy a threshold that warrants storing a new version.

2. The system of claim 1, further comprising:
    a version modification component that modifies at least a portion of the data to visibly distinguish older data from newer data and/or merge in older data when the threshold is satisfied.

3. The system of claim 2, wherein the version modification component modifies at least one of color, font, and font size to readily distinguish between older data and newer data or merged data.

4. The system of claim 1, wherein the local cache stores one or more versions of the data as the data is viewed, accessed, or available.

5. The system of claim 1, further comprising a notification component that notifies the user when a newer version of the data exists.

6. The system of claim 5, wherein the notification component notifies the user using at least one of the following: RSS feed, sending a message, a modified URL, and a hash-appended URL.

7. The system of claim 1, wherein the local cache stores differences in data between an older version and a newer version of the data.

8. The system of claim 1 further comprises at least one of the following to facilitate readily accessing stored data:
    the local browsing component that browses through the local cache according to at least one of the following: a selected time or time period of activity, page number or modified page number, name corresponding to the data, URLs, and/or appended URLs; and
    the search component that searches through the local cache based at least in part by at least one of the following: a selected time or time period of activity, page number or modified page number, name corresponding to the data, URLs, and/or appended URLs.

9. The system of claim 1, further comprising a web monitor that passively monitors desired web pages for changes in content and saves any updated web pages to the local cache.

10. The system of claim 1, wherein the analysis component further determines that there is a change to a banner advertisement on the web page, and in response to determining the change to the banner advertisement the analysis component determines that the threshold is not satisfied.

11. A method that facilitates persistent local storage and retrieval of web-based content, performed by one or more processors configured with computer-executable instructions, the method comprising:
monitoring a user's online activity and capturing data relating to the user's activity and current browsing state when the user is online, the data comprising at least the user's last position on a web page based on a corresponding viewport of the web page;
determining whether any changes that exist between versions of the captured data satisfy a threshold that warrants storing a new version;
automatically storing the captured data relating to the user's activity and current state in a local cache on a local machine to create a set of web-related information corresponding to the user's complete online activity over time based at least on a result of the determining, the set of web-related information being browsable to facilitate retrieval of stored data regardless of the local machine's connection state, the storing comprising storing a sequence of web pages visited by the user; and
automatically resuming a previous browsing session based on the data relating to the user's activity stored during the previous browsing session and based at least on a browsing path recalled for the previous browsing session such that, when a stored web page is opened from the local cache to resume the previous browsing session, the viewport for the stored web page corresponds to the user's last position on the stored web page.

12. The method of claim 11 further comprises notifying the user when a newer version of data is available by performing at least one of the following: employing an RSS feed, communicating a message, modifying a corresponding URL, and appending a hash to the URL.

13. The method of claim 11 further comprises:
determining whether any changes that exist between versions of the data captured satisfy a threshold; and
modifying at least a portion of the data to visibly distinguish older data from newer data and/or merge in older data when the threshold is satisfied.

14. The method of claim 13, modifying at least a portion of content on the data comprises modifying at least one of color, font, and font size.

15. The method of claim 13 further comprises storing a new version of the data in the local cache, the new version comprising at least one difference in content to a previous version.

16. The method of claim 11 further comprises storing differences in data between an older version and a newer version of the data to optimize manageability of the local cache.

17. The method of claim 11, the automatically resuming a previous browsing session further comprises retrieving at least one web page in the local cache and data relating to at least one of a web page viewed previously and a web page viewed subsequently.

18. The method of claim 11 further comprises passively monitoring desired web pages selected by the user for changes in content, and saving updated web pages to the local cache.

19. The method of claim 11 further comprises at least one of performing a search of or browsing the local cache to access any stored data.

20. A memory comprising instructions that, when executed on a processor, facilitate timeless local storage and retrieval of web-based content via operations comprising:
monitoring a user's online activity and capturing data relating to the user's activity and current browsing state when the user is online, the data comprising at least the user's last scroll position on a web page based on a corresponding viewport on the web page;
monitoring a change to a new version of the data;
determining whether the change to the new version of the data satisfies a threshold that warrants storing the new version of the data;
automatically storing the data relating to the user's activity and current state on a local machine to create a set of web-related information corresponding to the user's complete online activity over time based at least on a result of the determining, wherein the set of web-related information is browsable to facilitate retrieval of stored data regardless of the local machine's connection state, and wherein the ser of web-related information is searchable to facilitate finding the stored data and related web content on the local machine; and
automatically resuming a previous browsing session based on the data relating to the user's activity stored during the previous browsing session and based at least on a browsing path recalled for the previous browsing session, the browsing path comprising at least a sequence of web pages visited before or after a stored web page, wherein a web page in the sequence accessed during the previous browsing session before the stored web page was accessed is accessible by navigating back on the stored web page and another web page in the sequence accessed during the previous browsing session after the stored web page was accessed is accessible by clicking forward on the stored web page, and wherein, when the web page is opened from the local machine to resume the previous browsing session, the viewport for the web page corresponds to the user's last scroll position on the web page.

* * * * *